United States Patent
Lai et al.

(10) Patent No.: US 11,189,238 B2
(45) Date of Patent: Nov. 30, 2021

(54) DISPLAY DEVICE AND ELECTRONIC DEVICE

(71) Applicant: Acer Incorporated, New Taipei (TW)

(72) Inventors: Yi-Chang Lai, New Taipei (TW); Chih-Chiang Chen, New Taipei (TW); Hsu-Hsiang Tseng, New Taipei (TW); Chao-Shih Huang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/024,078

(22) Filed: Sep. 17, 2020

(65) Prior Publication Data

US 2021/0256917 A1    Aug. 19, 2021

(30) Foreign Application Priority Data

Feb. 19, 2020  (TW) .................................. 109105279

(51) Int. Cl.
*G09G 3/34*       (2006.01)
(52) U.S. Cl.
CPC ..... *G09G 3/342* (2013.01); *G09G 2310/0267* (2013.01); *G09G 2310/0275* (2013.01);
(Continued)
(58) Field of Classification Search
CPC ............. G09G 3/342; G09G 2330/023; G09G 2320/064; G09G 2320/0252;
(Continued)

(56) References Cited

U.S. PATENT DOCUMENTS

2009/0122033 A1* 5/2009 Park ...................... G06F 1/3265
                                                    345/204
2012/0050314 A1* 3/2012 Wang .................... G06F 3/1446
                                                    345/619
(Continued)

FOREIGN PATENT DOCUMENTS

| CN | 109493754 A | 3/2019 |
| TW | 201624266 A | 7/2016 |
| TW | 201709176 A | 3/2017 |

OTHER PUBLICATIONS

Chinese language office action dated Sep. 28, 2020, issued in application No. TW 109105279.

*Primary Examiner* — Ibrahim A Khan
(74) *Attorney, Agent, or Firm* — McClure, Qualey & Rodack, LLP

(57) ABSTRACT

A display device receiving image data generated by an image generator and including a first memory, a second memory, a selection circuit, a timing controller, and a display panel is provided. The first memory is configured to store first display data. The second memory is configured to store second display data. The second memory is disposed independent of the first memory. The selection circuit selects either the first display data or the second display data to serve as specific data based on a first selection signal. The timing controller generates the first selection signal according to the voltage level of a specific pin and provides the specific data to the image generator. The image generator generates the image data according to the specific data. The display panel displays an image based on the image data.

18 Claims, 5 Drawing Sheets

(52) U.S. Cl.
CPC . *G09G 2310/08* (2013.01); *G09G 2320/0252* (2013.01); *G09G 2320/064* (2013.01); *G09G 2320/0673* (2013.01); *G09G 2330/023* (2013.01)

(58) Field of Classification Search
CPC ....... G09G 2310/0275; G09G 2310/08; G09G 2320/0673; G09G 2310/0267
See application file for complete search history.

(56) References Cited

U.S. PATENT DOCUMENTS

| | | | |
|---|---|---|---|
| 2013/0194396 A1* | 8/2013 | Sonobe | H04N 13/30 348/51 |
| 2013/0278614 A1* | 10/2013 | Sultenfuss | G09G 3/3406 345/520 |
| 2016/0180491 A1* | 6/2016 | Lin | G09G 5/003 345/503 |
| 2017/0229093 A1* | 8/2017 | Sivertsen | G09G 5/006 |
| 2018/0047132 A1* | 2/2018 | Lu | G06F 3/0638 |
| 2018/0047370 A1* | 2/2018 | Chiang | G09G 5/363 |
| 2018/0286345 A1* | 10/2018 | Lee | G09G 5/006 |
| 2019/0295509 A1* | 9/2019 | Chang | G09G 5/391 |
| 2019/0348010 A1* | 11/2019 | Oh | H04N 21/43632 |
| 2020/0175912 A1* | 6/2020 | Lee | G09G 3/3225 |
| 2020/0302894 A1* | 9/2020 | Khen | G06F 3/14 |
| 2021/0103327 A1* | 4/2021 | Ansari | G06F 1/3265 |

* cited by examiner

DISPLAY DEVICE AND ELECTRONIC DEVICE

CROSS REFERENCE TO RELATED APPLICATIONS

This application claims priority of Taiwan Patent Application No. 109105279, filed on Feb. 19, 2020, the entirety of which is incorporated by reference herein.

BACKGROUND OF THE INVENTION

Field of the Invention

The invention relates to a display device, and more particularly to a display device that has different operation modes.

Description of the Related Art

Gaming notebook computers are currently popular. To improve the smoothness of the images displayed by the display panel of a gaming notebook computer, each manufacturer producing display cards used in gaming notebook computers uses a different synchronization technology. Additionally, a manufacturer that produces display panels also improves the response time of their display panel and the frame rate of display data. However, each display panel supports a single specific synchronization technology. When a display card in a gaming notebook computer is replaced, the display panel may not support the new display card.

BRIEF SUMMARY OF THE INVENTION

In accordance with an embodiment of the disclosure, a display device receives image data generated by an image generator and comprises a first memory, a second memory, a selection circuit, a timing controller, and a display panel. The first memory is configured to store first display data. The second memory is configured to store second display data. The second memory is disposed independent of the first memory. The selection circuit selects either the first display data or the second display data to serve as specific data based on a first selection signal. The timing controller generates the first selection signal according to the voltage level of a specific pin and provides the specific data to the image generator. The image generator generates the image data according to the specific data. The display panel displays an image based on the image data.

In accordance with another embodiment of the disclosure, an electronic device comprises an image generator and a display device. The image generator generates image data according to specific data. The display device comprises a first memory, a second memory, a selection circuit, a timing controller, and a display panel. The first memory is configured to store first display data. The second memory is configured to store second display data. The second memory is disposed independent of the first memory. The selection circuit selects either the first display data or the second display data to serve as the specific data based on a first selection signal. The timing controller generates the first selection signal according to the voltage level of a specific pin. The display panel displays an image based on the image data.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
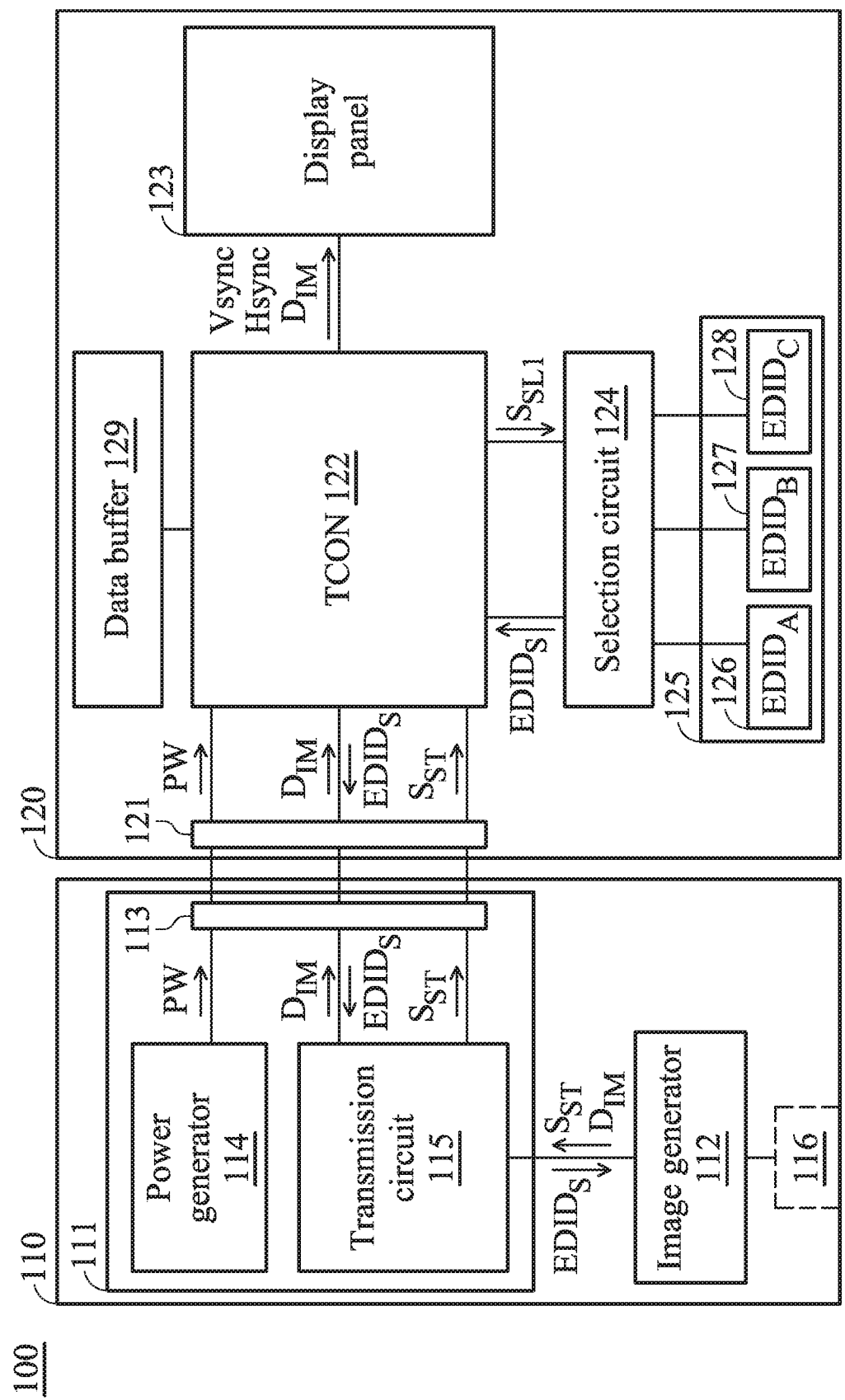
FIG. 1 is a schematic diagram of an exemplary embodiment of an electronic device, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an electronic device, according to various aspects of the present disclosure. The kind of electronic device 100 is not limited in the present disclosure. In one embodiment, the electronic device 100 is a notebook computer. As shown in FIG. 1, the electronic device 100 comprises a host 110 and a display device 120. The host 110 is configured to control the display device 120 to display an image. In this embodiment, the host 110 comprises a control circuit 111 and an image generator 112.

The control circuit 111 comprises a connection interface 113, a power generator 114 and a transmission circuit 115. The connection interface 113 is configured to couple to the display device 120. In this embodiment, the connection interface 113 outputs an operation voltage PW, image data $D_{IM}$, and a setting signal $S_{ST}$ to the display device 120 and receives specific data $EDID_S$ provided by the display device 120.

The power generator 114 is configured to generate the operation voltage PW. In this embodiment, the power generator 114 generates a single operation voltage PW, but the disclosure is not limited thereto. In another embodiment, the power generator 114 generates many operation voltages. In this case, the connection interface 113 comprises many pins to transmit different operation voltages. In other embodiments, the power generator 114 further provides power to other elements (e.g., the transmission circuit 115 or the image generator 112) of the host 110.

The transmission circuit 115 is coupled between the connection interface 113 and the image generator 112 to transmit the image data $D_{IM}$, the specific data $EDID_S$ and the setting signal $S_{ST}$. In one embodiment, the transmission circuit 115 comprises a transmitter (not shown) to transmit the setting signal $S_{ST}$ and the image data $D_{IM}$ generated by the image generator 112 to the connection interface 113. In other embodiments, when the image generator 112 is integrated into the control circuit 111, the transmission circuit 115 can be omitted. In this case, the image generator 112 directly provides the setting signal $S_{ST}$ and the image data $D_{IM}$ to the connection interface 113 and receives the specific data $EDID_S$ from the connection interface 113.

In this embodiment, the image generator 112 generates the setting signal $S_{ST}$ to direct the display device 120 to provide the specific data $EDID_S$. Then, the image generator 112 generates the image data $D_{IM}$ according to the specific data $EDID_S$. The kind of image generator 112 is not limited in the present disclosure. In one embodiment, the image generator 112 is a display card (not shown). In this case, the display card comprises a graphics processing unit (GPU) or a scalar.

The present disclosure is not limited how the image generator 112 generates the setting signal $S_{ST}$. In one embodiment, when a hardware 116 is operated, the image generator 112 generates the setting signal $S_{ST}$ according to the state of the hardware 116. For example, when the hardware 116 (e.g., a dip switch) is switched to a first state, the image generator 112 sets the setting signal $S_{ST}$ at a first level (e.g., a high level or a low level) to direct the display device 120 to enter a first operation mode. When the hardware 116 is switched to a second state, the image generator 112 sets the setting signal $S_{ST}$ at a second level (e.g., a low level or a high level) to direct the display device 120 to enter a second operation mode.

In other embodiments, when the number of the hardware 116 is increased or the hardware 116 provides many switchable states, the image generator 112 may generate more setting signals. For example, when the hardware 116 is in a first state, the image generator 112 generates a first setting signal and a second setting signal and sets each of the first and second setting signals to a low level. When the hardware 116 is in a second state, the image generator 112 generates a first setting signal and a second setting signal, sets the first setting signal to a low level, and sets the second setting signal to a high level. When the hardware 116 is in a third state, the image generator 112 generates a first setting signal and a second setting signal, sets the first setting signal to a high level, and sets the second setting signal to a low level. When the hardware 116 is in a fourth state, the image generator 112 generates a first setting signal and a second setting signal and sets each of the first and second setting signals to a high level. In this cases, the first and second setting signals are transmitted to the display device 120 by the different pins of the connection interface 113.

In some embodiments, the image generator 112 generates the setting signal SST according the operation state of a software. For example, when a user opens a first specific software (e.g., a game), the image generator 112 sets the setting signal SST at a first level. When the user opens a second specific software (e.g., Microsoft Word), the image generator 112 sets the setting signal SST at a second level.

In some embodiment, the image generator 112 generates many setting signals according to the operation state of the software. For example, when the user opens a first specific software, the image generator 112 sets a first setting signal at a low level and sets a second setting signal at the low level. When the user opens a second specific software, the image generator 112 sets a first setting signal at a low level and sets a second setting signal at a high level. When the user opens a third specific software, the image generator 112 sets a first setting signal at a high level and sets a second setting signal at a low level. When the user opens a fourth specific software, the image generator 112 sets a first setting signal at a high level and sets a second setting signal at the high level.

In some embodiments, when a mode switching function of the BIOS (not shown) of the host 110 is switched to an on-state, the host 110 dynamically adjusts the operation mode of the display device 120 according to the state of the hardware 116 or the state of a software. For example, when the mode switching function of the BIOS of the host 110 is switched to an on-state, if the user opens a first specific software, the image generator 112 directs the display device 120 to enter a first operation mode. In other embodiments, when the mode switching function of the BIOS of the host 110 is switched to an on-state, if the hardware 116 is switched to a first state, the image generator 112 directs the display device 120 to enter the first operation mode.

The display device 120 enters different operation modes according to the level of the setting signal $S_{ST}$. In the different operation modes, the display device 120 provides different specific data $EDID_S$ to the image generator 112. The image generator 112 generates the corresponding image data $D_{IM}$ according to different specific data $EDID_S$. In this embodiment, the display device 120 comprises a connection interface 121, a timing controller (TCON) 122, a display panel 123, a selection circuit 124, and a storage circuit 125.

The connection interface 121 is configured to receive the operation voltage PW, the image data $D_{IM}$ and the setting signal $S_{ST}$ from the host 110 and provides the specific data $EDID_S$ to the host 110. In one embodiment, the connection interface 121 comprises a specific pin to receive the setting signal $S_{ST}$. In other embodiments, when the image generator 112 generates more setting signals, the setting signals are received by different pins of the connection interface 121. Similarly, when the host 110 provides more operation voltages, the operation voltages are received by different pins of the connection interface 121. Since the feature of the connection interface 121 is the same as the feature of the connection interface 113, the description of the feature of the connection interface 121 is omitted.

The TCON 122 receives the operation voltage PW and generates a selection signal $S_{SL1}$ according to the setting signal $S_{ST}$. In one embodiment, when a first specific pin of the connection interface 121 receives the setting signal $S_{ST}$, the TCON 122 generates the selection signal $S_{SL1}$ according to the voltage level of the first specific pin. In other embodiments, when a first specific pin of the connection interface 121 receives a first setting signal and a second specific pin of the connection interface 121 receives a second setting signal, the TCON 122 generates the selection signal $S_{SL1}$ according to the voltage levels of the first and second specific pins.

The selection circuit 124 uses one of the display data $EDID_A \sim EDID_C$ as the specific data $EDID_S$ according to the selection signal $S_{SL1}$. For example, when the setting signal $S_{ST}$ is at a first level, the TCON 122 enters a first operation mode. In the first operation mode, the TCON 122 may utilize the selection signal $S_{SL1}$ to direct the selection circuit 124 to use the display data $EDID_A$ as the specific data $EDID_S$. When the setting signal $S_{ST}$ is at a second level, the TCON 122 enters a second operation mode. In the second operation mode, the TCON 122 directs the selection circuit 124 to use the display data $EDID_B$ as the specific data $EDID_S$. When the setting signal $S_{ST}$ is at a third level, the TCON 122 enters a third operation mode. In the third operation mode, the TCON 122 directs the selection circuit 124 to use the display data $EDID_C$ as the specific data $EDID_S$.

In this embodiment, the TCON 122 receives the specific data $EDID_S$ and outputs the specific data $EDID_S$ via the connection interface 121. In other embodiments, the selection circuit 124 directly outputs the specific data $EDID_S$ to the connection interface 121. The structure of the selection circuit 124 is not limited in the present disclosure. In one embodiment, the selection circuit 124 is a switch circuit. In another embodiment, the selection circuit 124 is a multiplexer.

The storage circuit 125 is configured to store the display data $EDID_A\sim EDID_C$. In this embodiment, the storage circuit 125 comprises memories 126~128. The memories 126~128 are independent of each other. The memory 126 is configured to store the display data $EDID_A$. The memory 127 is configured to store the display data $EDID_B$. The memory 128 is configured to store the display data $EDID_C$. The kinds of memories 126~128 are not limited in the present disclosure. In one embodiment, the memories 126~128 are electrically erasable programmable read only memory (EEPROM).

In other embodiments, the memory address of the display data $EDID_A$ stored in the memory 126 is the same as the memory address of the display data $EDID_B$ stored in the memory 127 and the memory address of the display data $EDID_C$ stored in the memory 128. For example, the display data $EDID_A$ is stored in the memory blocks corresponding to the memory address 0037~004X of the memory 126. In this case, the display data $EDID_B$ is stored in the memory blocks corresponding to the memory address 0037~004X of the memory 127, and the display data $EDID_C$ is stored in the memory blocks corresponding to the memory address 0037~004X of the memory 128.

In other embodiments, the TCON 122 processes and transforms the operation voltage PW to generate a transformation result and provides the transformation result to other elements, such as the display panel 123, the selection circuit 124, and/or the storage circuit 125. In this embodiment, the TCON 122 further decodes the image data $D_{IM}$ to generate the vertical synchronization signal Vsync and a horizontal synchronization signal Hsync.

The display panel 123 operates according to the vertical synchronization signal Vsync, the horizontal synchronization signal Hsync and the image data $D_{IM}$. In this embodiment, the display panel 123 receives the image data $D_{IM}$ via the TCON 122, but the disclosure is not limited thereto. In other embodiments, the display panel 123 may directly receive the image data $D_{IM}$ from the connection interface 121. The kind of display panel 123 is not limited in the present disclosure. In one embodiment, the display panel 123 is an active matrix organic light emitting diode (AMOLED) panel or an active matrix liquid crystal display (AMLCD) panel.

In this embodiment, the display data $EDID_A\sim EDID_C$ support different vertical synchronization technologies. For example, the display data $EDID_A$ supports the vertical synchronization technology (e.g., the Adaptive Sync technology) provided by Intel company. In other embodiments, the display data $EDID_B$ supports the vertical synchronization technology (e.g., the G-Sync technology) provided by NVIDIA company, and the display data $EDID_C$ supports the vertical synchronization technology (e.g., the Free-Sync technology) provided by AMD company.

When the user opens a first specific software, the image generator 112 utilizes the setting signal $S_{ST}$ to direct the display device 120 to enter a first operation mode. Therefore, the TCON 122 directs the power generator 114 to use the display data $EDID_A$ as the specific data $EDID_S$. The image generator 112 generates the image data $D_{IM}$ according to the specific data $EDID_S$. In this case, assuming that the frames-per-second (FPS) of the image generator 112 is a first predetermined value, such as 120 Hz. It means that the image generator 112 provides 120 images per second. At this time, the TCON 122 generates the vertical synchronization signal Vsync and the horizontal synchronization signal Hsync according to the image data $D_{IM}$. In one embodiment, the frequency of the vertical synchronization signal Vsync is also 120 Hz which means that the display panel 123 refreshes 120 images per second. At this time, the refresh rate of the display panel 123 is the same as the FPS of the image generator 112. Therefore, the smoothness of the images displayed by the display panel 123 is increased and there is no screen tearing problem in the images displayed by the display panel 123.

However, when the user opens a second specific software (for example, the user may surf websites or perform a word processing), the image generator 112 directs the display device 120 to enter a second operation mode. In the second operation mode, the TCON 122 directs the power generator 114 to use the display data $EDID_B$ as the specific data $EDID_S$. The image generator 112 generates the image data $D_{IM}$ according to the specific data $EDID_S$. In this case, the FPS of the image generator 112 is a second predetermined value, such as 60 Hz, and it means that the image generator 112 provides 60 images per second. Therefore, the TCON 122 adjusts the blanking intervals of the vertical synchronization signal Vsync according to the image data $D_{IM}$. In one embodiment, the frequency of the vertical synchronization signal Vsync is also 60 Hz. Since the refresh rate of the display panel 123 is the same as the FPS of the image generator 112, there are no lag problems in the images displayed by the display panel 123.

In other embodiments, when the user does not open any specific software (for example, the host 110 is in an idle state), the image generator 112 directs the display device 120 to enter a third operation mode. In this mode, the TCON 122 directs the power generator 114 to serve the display data $EDID_C$ as the specific data $EDID_S$. The image generator 112 generates the image data $D_{IM}$ according to the specific data $EDID_S$. At this time, the FPS of the image generator 112 may be a third predetermined value, such as 48 Hz. Therefore, the TCON 122 adjusts the refresh rate of the display panel 123 according to the FPS of the image generator 112 to reduce the power consumption of the display device 120.

In this embodiment, since the display device 120 supports different vertical synchronization technologies, the display device 120 can be used with any brand of image generator 112. For example, when the image generator 112 is the display card produced by Intel company, the user may switch the hardware 116 into a first state. Therefore, the image generator 112 utilizes the setting signal $S_{ST}$ to direct the display device 120 to enter a first operation state to output the display data $EDID_A$. When the image generator 112 is the display card produced by NVIDIA company, the user may switch the hardware 116 into a second state. Therefore, the image generator 112 utilizes the setting signal $S_{ST}$ to direct the display device 120 to enter a second operation state to output the display data $EDID_B$. When the display device 120 is produced by AMD company, the user may switch the hardware 116 into a third state. Therefore, the image generator 112 utilizes the setting signal $S_{ST}$ to direct the display device 120 outputs the display data $EDID_C$.

In one embodiment, each of the display data $EDID_A\sim EDID_C$ is extended display identification data (EDID) that means the resolution and the pixel clock of the display panel 123, the name of the manufacturer producing the display panel 123, and the serial number of the display panel 123. In this case, each display data may comprise many pixel clocks. The image generator 112 dynamically adjusts the FPS according to the pixel clocks. For example, when the image generator 112 needs to provide a lot of images, the image generator 112 utilizes a pixel clock that has high frequency (e.g., 180 Hz) to generate the image data $D_{IM}$. When the image generator 112 does not need to provide a lot of images, the image generator 112 utilizes a pixel clock that has low frequency (e.g., 160 Hz) to generate the image data $D_{IM}$. In this case, although the display device 120 operates in the same operation mode, the display device 120 provides different refresh rates according to the image data $D_{IM}$ that has different frequencies.

In other embodiments, the display device 120 further comprises a data buffer 129 to store predetermined data. When the image generator 112 switches the operation mode of the display device 120 (i.e., the level of the setting signal $S_{ST}$ is changed), before the TCON 122 receives the image data $D_{IM}$, the display panel 123 may display a black image. Therefore, when the level of the setting signal $S_{ST}$ is changed, the TCON 122 reads the predetermined data stored in the data buffer 129 to direct the display panel 123 to display a predetermined image. In one embodiment, the data buffer 129 stores the last complete image. Therefore, when the level of the setting signal $S_{ST}$ is changed or the image generator 112 does not generate the image data $D_{IM}$, the image displayed in the display panel 123 is unchanged. In one embodiment, the data buffer 129 is integrated in the TCON 122.

Figure 2:
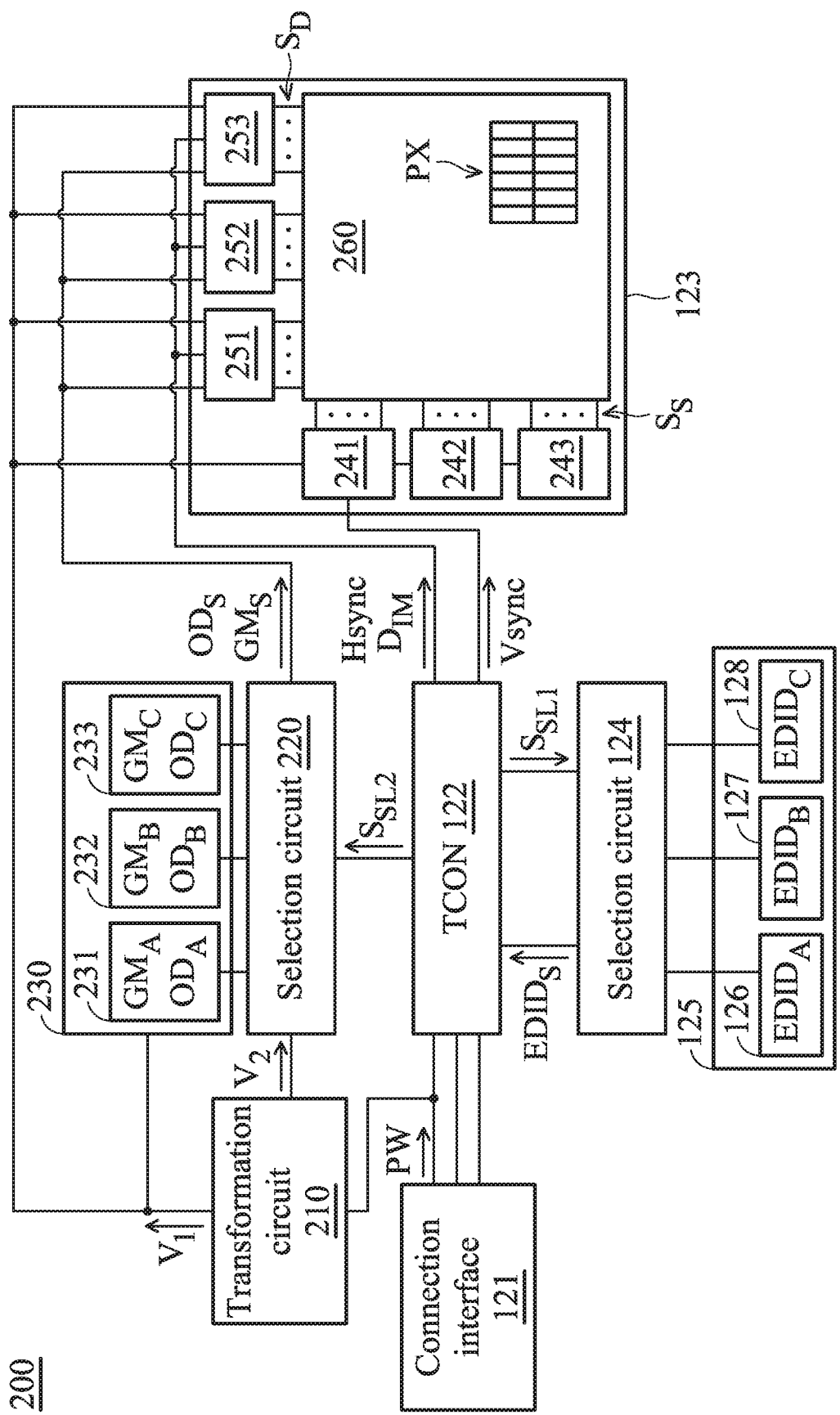
FIG. 2 is a schematic diagram of an exemplary embodiment of a display device, according to various aspects of the present disclosure.

FIG. 2 is a schematic diagram of an exemplary embodiment of the display device, according to various aspects of the present disclosure. FIG. 2 is similar to FIG. 1 exception that the display device 200 of FIG. 2 further comprises a transformation circuit 210, a selection circuit 220 and a storage circuit 230. In this embodiment, when the display device 200 operates in different operation modes, the display panel 123 displays images according to different gamma curves called as gamma and look up tables.

In this embodiment, the transformation circuit 210 transforms the level of the operation voltage PW to generate voltages $V_1$ and $V_2$. The voltage $V_1$ may be the same as or different from the voltage $V_2$. The transformation circuit 210 provides the voltage $V_1$ to the display panel 123 and the storage circuit 230 and provides the voltage $V_2$ to the selection circuit 220. In other embodiments, the transformation circuit 210 further provides the voltage $V_1$ to the storage circuit 125 and provides the voltage $V_2$ to the selection circuit 124. In one embodiment, the transformation circuit 210 is a DC/DC converter.

The selection circuit 220 uses one of the gamma curves $GM_A$~$GM_C$ as a specific curve $GM_S$ according to the selection signal $S_{SL2}$ and provides the specific curve $GM_S$ to the display panel 123. In this embodiment, the selection signal $S_{SL2}$ is provided by the TCON 122. The TCON 122 generates the selection signal $S_{SL2}$ according to the setting signal $S_{ST}$. Since the feature of the selection circuit 220 is the same as the feature of the selection circuit 124, the description of the feature of the selection circuit 220 is omitted.

The storage circuit 230 stores the gamma curves $GM_A$~$GM_C$. In this embodiment, the storage circuit 230 comprises memories 231~233. The memory 231 is configured to store the gamma curve $GM_A$. The memory 232 is configured to store the gamma curve $GM_B$. The memory 233 is configured to store the gamma curve $GM_C$.

In other embodiments, the memories 231~233 further store overdrive information $OD_A$~$OD_C$. In this case, the selection circuit 220 uses the overdrive information $OD_A$~$OD_C$, the overdrive information $OD_B$ or the overdrive information $OD_C$ as specific information ODs and provides the specific information ODs to the display panel 123. In some embodiments, the gamma curves $GM_A$~$GM_C$ and the overdrive information $OD_A$~$OD_C$ are stored in the memories 126~128. In this case, the selection circuit 124 outputs the data stored in the corresponding memory according to the selection signal $S_{SL1}$.

In one embodiment, when the display device 200 enters a first operation mode, the selection circuit 220 uses the gamma curve $GM_A$ as the specific curve $GM_S$. When the display device 200 enters a second operation mode, the selection circuit 220 uses the gamma curve $GM_B$ as the specific curve $GM_S$. When the display device 200 enters a third operation mode, the selection circuit 220 uses the gamma curve $GM_C$ as the specific curve $GM_S$.

In another embodiment, when the display device 200 enters the first operation mode, the TCON 122 determines the FPS of the image generator 112 according to the image data $D_{IM}$ and directs the selection circuit 220 to dynamically use one of the gamma curves $GM_A$~$GM_C$ as the specific curve $GM_S$ according to the FPS of the image generator 112. For example, in the first operation mode, when the FPS of the image generator 112 is 180 Hz, the TCON 122 may direct the selection circuit 220 to use the gamma curve $GM_A$ as the specific curve $GM_S$. In this mode, when the FPS of the image generator 112 is 120 Hz, the TCON 122 may direct the selection circuit 220 to use the gamma curve $GM_B$ as the specific curve $GM_S$. Therefore, in the same operation mode, the selection circuit 220 dynamically uses one of the gamma curves $GM_A$~$GM_C$ as the specific curve $GM_S$.

In other embodiments, the display panel 123 comprises gate drivers 241~243, data drivers 251~253, and a display area 260. The display area 260 comprises a plurality of pixels PX. In one embodiment, the pixels PX is arranged into a matrix.

The gate drivers 241~243 generate a plurality of scan signals $S_S$ to the pixels PX according to the vertical synchronization signal Vsync. The number of gate drivers is not limited in the present disclosure. In other embodiments, the display panel 123 may comprise fewer or more gate drivers.

The data drivers 251~253 generate a plurality of data signals SD to the pixels PX according to the horizontal synchronization signal Hsync, the image data $D_{IM}$ and the specific curve $GM_S$. In other embodiments, the display panel 123 may comprise fewer or more data drivers. In some embodiments, the data drivers 251~253 generate the data signals SD to the pixels PX according to the specific information ODs.

Figure 3A:
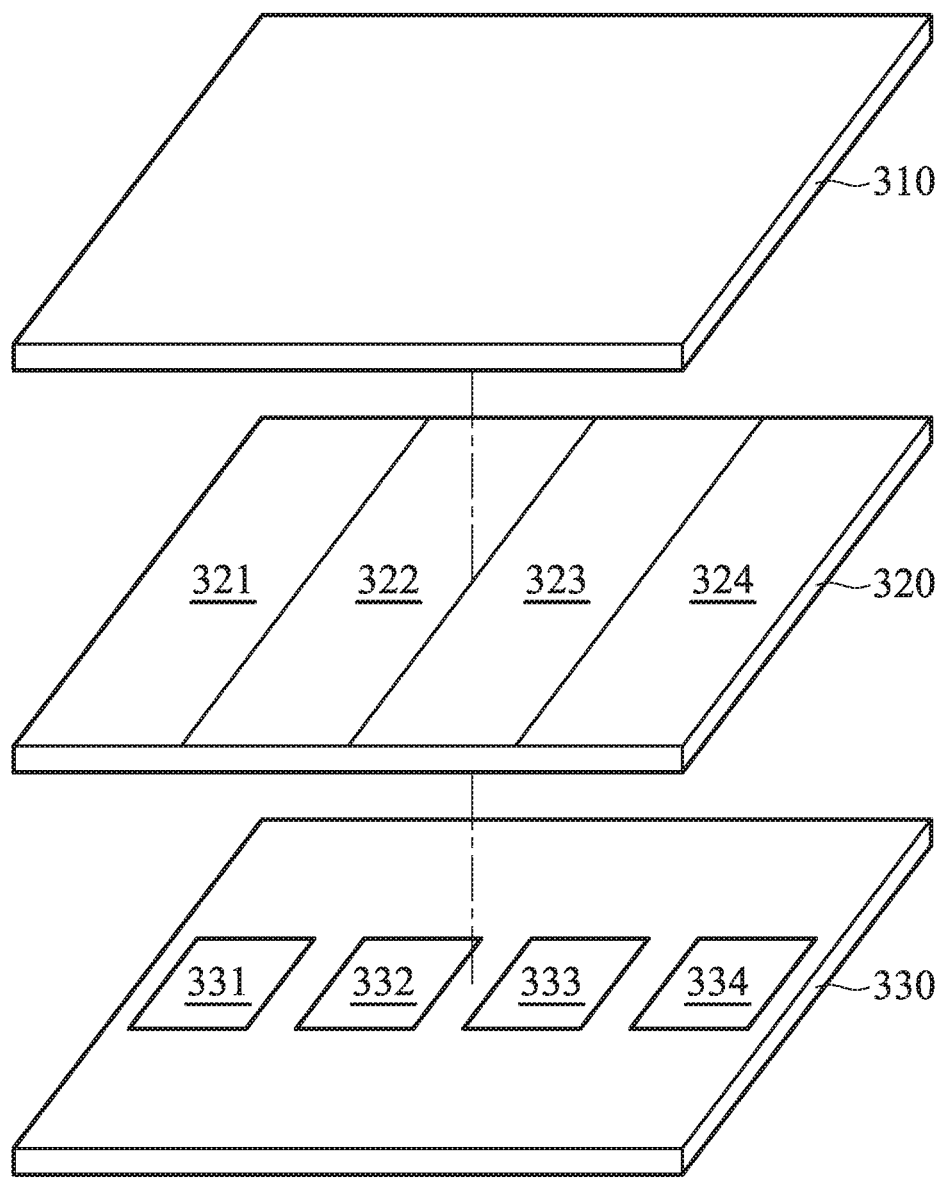
FIG. 3A is a schematic diagram of an exemplary embodiment of a display panel, according to various aspects of the present disclosure.

FIG. 3A is a schematic diagram of an exemplary embodiment of a display panel, according to various aspects of the present disclosure. The display panel 300 comprises a substrate 310, a backlight plate 320 and a back cover 330. In one embodiment, the pixels shown in FIG. 2 are formed on the substrate 310. In this case, the gate drivers 241~243 and the data drivers 251~253 may also form on the substrate 310. In other embodiments, the data driver 251 is disposed in a first flexible print circuit (FPC), the data driver 252 is disposed in a second FPC, and the data driver 253 is disposed in a third FPC. In this case, the first, second and third FPCs are coupled to the substrate 310 to provide the data signals to the pixels PX.

The backlight plate 320 comprises luminous zones 321~324. In this embodiment, the TCON 122 utilizes a high dynamic range (HDR) local dimming technology to light at least one of the luminous zones 321~324 in a specific sequence and controls the brightness of the luminous zones 321~324. When the luminous zones 321~324 are lit, light is capable of passing through the substrate 310 and the back cover 330. In other embodiments, the backlight plate 320 comprises more luminous zones.

In some embodiments, the TCON 122 controls the sequence and the speed of lighting the luminous zones 321~324, and the brightness and the colors of the luminous zones 321~324 according to the operation mode of the display device 200. For example, when the display device 200 enters a first operation mode, the TCON 122 sequentially lights up the luminous zones 321~324. When the display device 200 enters a second operation mode, the TCON 122 sequentially lights up the luminous zones 324~321. In other embodiments, when the display device 200 enters the first operation mode, the TCON 122 lights the luminous zones 321~324. In this case, the colors of the lights passing through the luminous zones 321~324 are red. In other embodiments, when the display device 200 enters the second operation mode, the TCON 122 lights the luminous zones 321~324. In this case, the colors of the lights passing through the luminous zones 321~324 are green.

The back cover 330 has hollowed-out areas 331~334. In one embodiment, the back cover 330 is the A cover of the notebook computer. In other words, the back cover 330 is the outer-side of the top cover of the notebook computer. In this embodiment, the hollowed-out area 331 corresponds to the luminous zone 321, the hollowed-out area 332 corresponds to the luminous zone 322, the hollowed-out area 333 corresponds to the luminous zone 323, and the hollowed-out area 334 corresponds to the luminous zone 324. Therefore, when the luminous zones 321~324 are lit, the lights can pass through the hollowed-out areas 331~334. The colors of the lights passing through the hollowed-out areas 331~334 are not limited in the present disclosure. In one embodiment, the colors of the lights passing through the hollowed-out areas 331~334 are white or other colors.

Figure 3B:
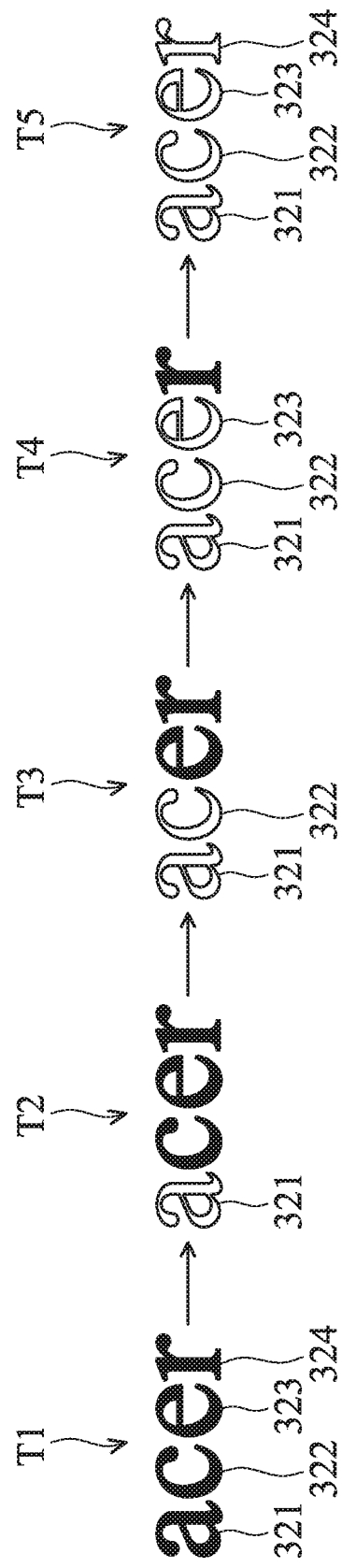
FIG. 3B is a schematic diagram of an exemplary embodiment of a lighting sequence of the hollowed-out areas of the display panel, according to various aspects of the present disclosure.

FIG. 3B is a schematic diagram of an exemplary embodiment of a lighting sequence of the hollowed-out areas 331~334, according to various aspects of the present disclosure. In this embodiment, the shapes of the hollowed-out areas 331~334 are the text "acer". In this case, in the period T1, the luminous zones 321~324 are not lit. Therefore, there is no light passing through the hollowed-out areas 331~334. In period T2, only the luminous zone 321 is lit. Therefore, the light passes through the hollowed-out area 331. In period T3, the luminous zones 321 and 322 are lit. Therefore, the lights pass through the hollowed-out areas 331 and 332. In period T4, the luminous zones 321~323 are lit. Therefore, the lights pass through the hollowed-out areas 331~333. In period T5, the luminous zones 321~324 are lit. Therefore, the lights pass through the hollowed-out areas 331~334.

Figure 4:
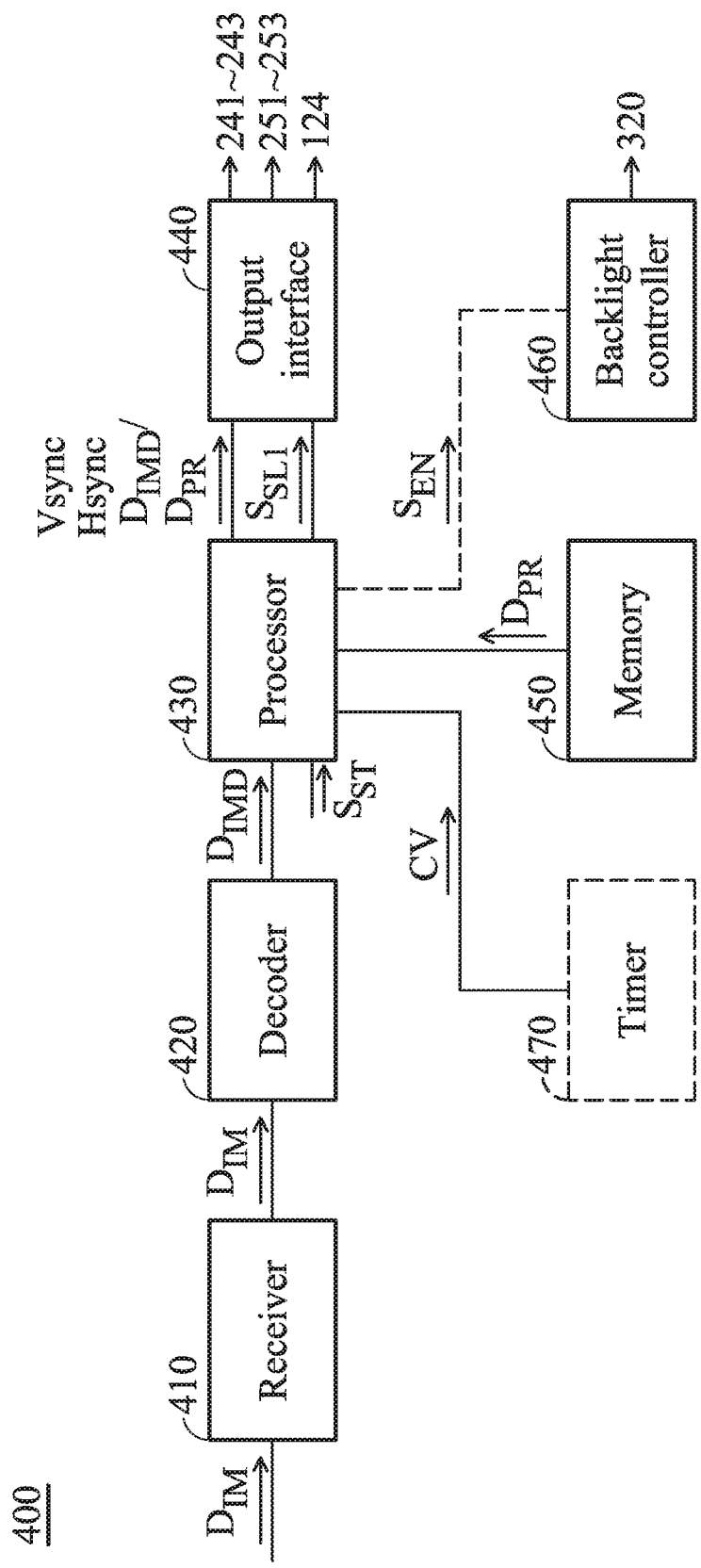
FIG. 4 is a schematic diagram of an exemplary embodiment of a timing controller, according to various aspects of the present disclosure.

FIG. 4 is a schematic diagram of an exemplary embodiment of a TCON, according to various aspects of the present disclosure. The TCON 400 comprises a receiver 410, a decoder 420, a processor 430, an output interface 440, a memory 450, and a backlight controller 460. The receiver 410 is configured to receive and output the image data $D_{IM}$ to the decoder 420. In one embodiment, the receiver 410 has an embedded display port (eDP) to receive the image data $D_{IM}$.

The decoder 420 decodes the image data $D_{IM}$ to generate decoded data $D_{IMD}$. In one embodiment, the decoder 420 supports the image data $D_{IM}$ which is encrypted by a high-bandwidth digital content protection (HDCP) technology.

The processor 430 processes the decoded data $D_{IMD}$ to generate the vertical synchronization signal Vsync, the horizontal synchronization signal Hsync and the selection signal $S_{SL1}$. In one embodiment, the processor 430 further outputs the decoded data Di to the output interface 440. In other embodiments, the processor 430 may receive and output the image data $D_{IM}$ to the output interface 440. In some embodiments, the processor 430 supports a panel self refresh (PSR) technology to control the refresh rate of the display panel.

The output interface 440 is configured to output the vertical synchronization signal Vsync and the horizontal synchronization signal Hsync to the gate drivers 241~243 and the data drivers 251~253. Additionally, the output interface 440 further outputs the selection signal $S_{SL1}$ to the selection circuit 124.

In other embodiments, when the operation mode of the display device 120 is changed, the processor 430 reads predetermined data $D_{PR}$ stored in the memory 450 and changes the vertical synchronization signal Vsync and the horizontal synchronization signal Hsync according to the predetermined data $D_{PR}$ to avoid that the display panel 123 displays a black image or the image flickers. In one embodiment, each when the processor 430 outputs frame data to the display panel via the output interface 440, the processor 430 stores the frame data in the memory 450. In this case, when the level of the setting signal $S_{ST}$ is changed, the processor 430 reads and outputs the frame data stored in the memory 450 to the display panel. In other embodiments, the memory 450 may be disposed outside of the TCON 400.

In some embodiments, before the image generator 112 generates the image data $D_{IM}$, the processor 430 directs the display panel to display a specific image (e.g., the logo of the manufacturer producing the display device) according to the predetermined data $D_{PR}$ stored in the memory 450. Taking FIG. 1 as an example, when the host 110 is turned on, before the host 110 enters the operation system (e.g., Windows), the processor 430 outputs the predetermined data $D_{PR}$ to the display panel 123 via the output interface 440 to display the logo of the manufacturer producing the display device. In this case, the pattern of the logo of the display device is pre-stored in the memory 450. In other embodiments, when the host 110 is abnormal, before the display device 120 receives the image data $D_{IM}$, the processor 430 provides the predetermined data $D_{PR}$ to the display device 120 such that the display device 120 displays a predetermined image.

In this embodiment, the processor 430 generates an enable signal $S_{EN}$ and provides the enable signal $S_{EN}$ to the backlight controller 460. The backlight controller 460 controls the backlight plate 320 according to the enable signal $S_{EN}$. For example, when the host 110 is turned on, the backlight controller 460 controls the sequence of lighting the luminous zones 321~324 of the backlight plate 320 according to the enable signal $S_{EN}$. In one embodiment, the memory 450 further stores a predetermined sequence. In this case, the processor 430 generates the enable signal $S_{EN}$ according to the predetermined sequence stored in the memory 450. In other embodiments, the enable signal $S_{EN}$ is a pulse width modulation (PWM) signal.

In other embodiments, when a portion of the luminous zones of the backlight plate 320 are not lit, if the cursor moves quickly from a lit luminous zone (e.g., 321) to an unlit luminous zone (e.g., 324), the user cannot immediately find the position of the cursor in the display panel. However, each when the processor 430 outputs the frame data to the display panel via the output interface 440, the processor 430 stores the frame data in the memory 450. Therefore, the processor 430 can compare the frame data and previous frame data stored in the memory 450 to forecast which luminous zone should be lit or not in the next frame data, wherein the frame data is followed by the previous frame data. For example, in the previous frame data, the cursor is in the luminous zone 321, and in the current frame data, the cursor is in the luminous zone 322. At this time, the processor 430 forecasts that the cursor will be moved to the luminous zone 323. Therefore, the processor 430 utilizes the enable signal $S_{EN}$ to direct the backlight controller 460 to pre-light the luminous zone 323 before the next frame data is output to the display panel.

In other embodiments, the TCON 400 further comprises a timer 470. The timer 470 is configured to record the usage time of the display device 120. In this case, the processor 430 outputs the count value CV of the timer 470 to the image generator 112. The image generator 112 appropriately adjusts the image data $D_{IM}$ according to the count value CV. In one embodiment, when the count value CV arrives a threshold value, the image generator 112 directs the display panel 123 to display a notice image via the image data $D_{IM}$. The user performs a color correction operation according to the notice image. In another embodiment, the processor 430 directly processes the decoded data $D_{IMD}$ to correct the color of the image displayed in the display panel 123.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A display device receiving image data generated by an image generator and comprising:
    a first memory configured to store first display data;
    a second memory configured to store second display data, wherein the second memory is disposed independent of the first memory;
    a selection circuit selecting the first display data or the second display data as specific data according to a first selection signal;
    a timing controller generating the first selection signal according to a voltage level of a specific pin and providing the specific data to the image generator, wherein the image generator generates the image data according to the specific data; and
    a display panel displaying an image according to the image data,
    wherein the display panel comprises:
    a display area comprising a plurality of pixels;
    a gate driver generating a plurality of scan signals and providing the scan signals to the pixels according to a vertical synchronization signal; and
    a data driver generating a plurality of data signals and providing the data signals to the pixels according to the image data and a specific curve,
    wherein the timing controller decodes the image data to generate a second selection signal and the vertical synchronization signal, the selection circuit uses a first gamma curve or a second gamma curve as the specific curve and provides the specific curve to the data driver according to the second selection signal.

2. The display device as claimed in claim 1, wherein a memory address of the first display data stored in the first memory is the same as a memory address of the second display data stored in the second memory.

3. The display device as claimed in claim 1, wherein the first gamma curve is stored in the first memory, and the second gamma curve is stored in the second memory.

4. The display device as claimed in claim 1, further comprising:
    a third memory configured to store the first gamma curve; and
    a fourth memory configured to store the second gamma curve,
    wherein the first, second, third and fourth memories are independent of each other.

5. The display device as claimed in claim 1, wherein:
    in response to the specific data being the first display data, the vertical synchronization signal has a first frequency,
    in response to the specific data being the second display data, the vertical synchronization signal has a second frequency, and
    the first frequency is different from the second frequency.

6. The display device as claimed in claim 1, wherein in response to the voltage level of the specific pin changing, the image remains unchanged.

7. The display device as claimed in claim 1, wherein before the image generator generates the image data, the display panel displays a specific image.

8. The display device as claimed in claim 1, wherein the display panel comprises:
    a backlight plate comprising a plurality of luminous zones,
    wherein the timing controller lights at least one of the luminous zones according to a specific sequence.

9. The display device as claimed in claim 1, further comprising:
    a timer adjusting a count value according to usage time of the display panel,
    wherein the image generator adjusts the image data according to the count value.

10. An electronic device comprising:
    an image generator generating image data according to specific data; and
    a display device comprising:
    a first memory configured to store first display data;
    a second memory configured to store second display data, wherein the second memory is disposed independent of the first memory;
    a selection circuit selecting the first display data or the second display data as the specific data according to a first selection signal;
    a timing controller generating the first selection signal according to a voltage level of a specific pin; and
    a display panel displaying an image according to the image data,
    wherein the display panel comprises:
    a display area comprising a plurality of pixels;
    a gate driver generating a plurality of scan signals and providing the scan signals to the pixels according to a vertical synchronization signal; and a data driver generating a plurality of data signals and providing the data signals to the pixels according to the image data and a specific curve, wherein the timing controller decodes the image data to generate a second selection signal and the vertical synchronization signal, the selection circuit uses a first gamma curve or a second gamma curve as the specific curve and provides the specific curve to the data driver according to the second selection signal.

11. The electronic device as claimed in claim 10, wherein a memory address of the first display data stored in the first memory is the same as a memory address of the second display data stored in the second memory.

12. The electronic device as claimed in claim 10, wherein the first gamma curve is stored in the first memory, and the second gamma curve is stored in the second memory.

13. The electronic device as claimed in claim 10, further comprising:
- a third memory configured to store the first gamma curve;
- a fourth memory configured to store the second gamma curve,
- wherein the first, second, third and fourth memories are independent of each other.

14. The electronic device as claimed in claim 10, wherein:
- in response to the specific data being the first display data, the vertical synchronization signal has a first frequency,
- in response to the specific data being the second display data, the vertical synchronization signal has a second frequency, and
- the first frequency is different from the second frequency.

15. The electronic device as claimed in claim 10, wherein in response to the voltage level of the specific pin changing, the image remains unchanged.

16. The electronic device as claimed in claim 10, wherein before the image generator generates the image data, the display panel displays a specific image.

17. The electronic device as claimed in claim 10, wherein the display panel comprises:
- a backlight plate comprising a plurality of luminous zones,
- wherein the timing controller lights at least one of the luminous zones according to a specific sequence.

18. The electronic device as claimed in claim 10, further comprising:
- a timer adjusting a count value according to usage time of the display panel,
- wherein the image generator adjusts the image data according to the count value.

* * * * *